3,004,347
DRYING OF SOLID MATERIALS
Ernest W. Dobson, Media, Pa., assignor to Sun Oil Company, Philadelphia, Pa., a corporation of New Jersey
Filed Dec. 8, 1958, Ser. No. 778,656
3 Claims. (Cl. 34—35)

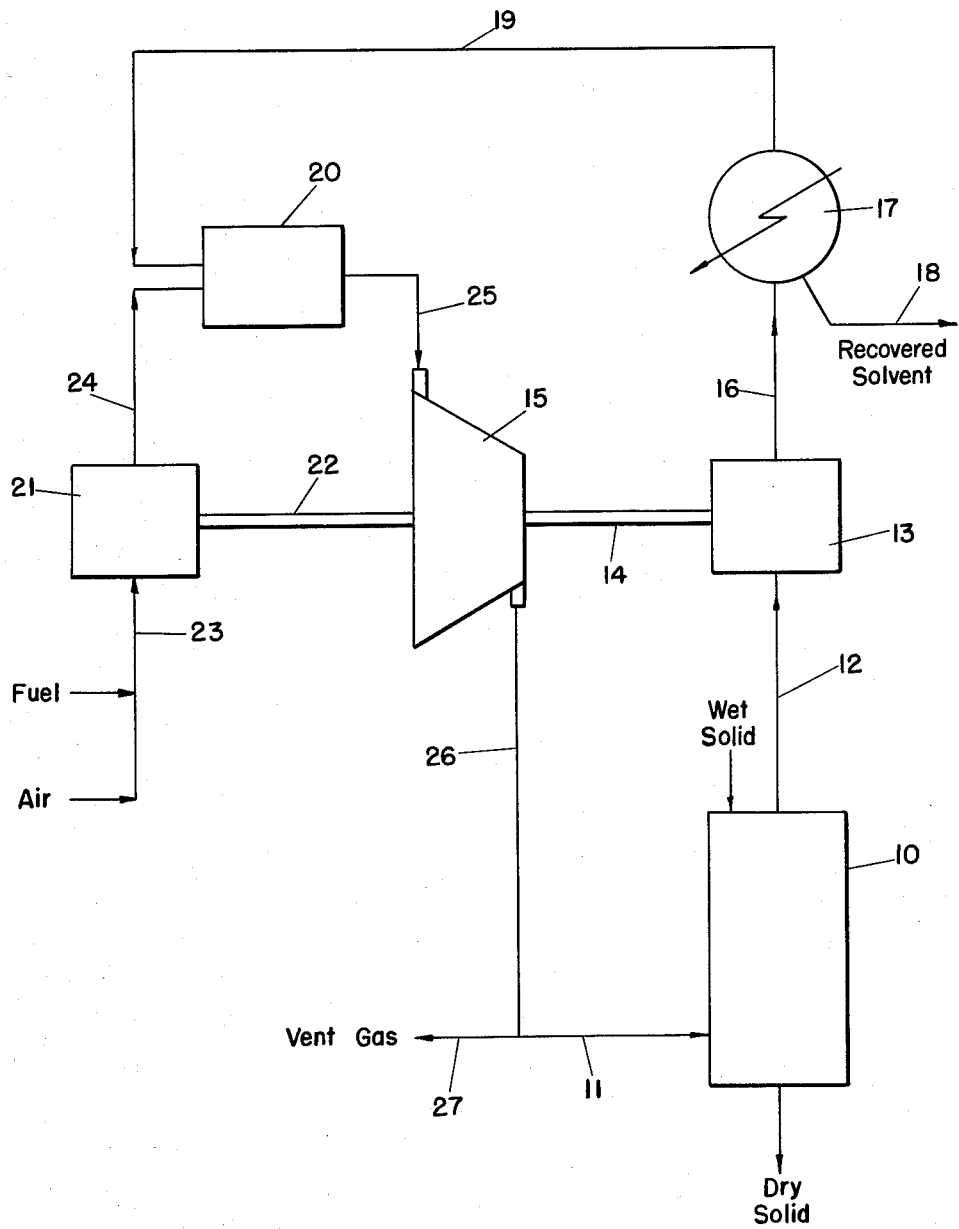

This invention relates to the drying of solid materials and more particularly to improved method and means for removing from a solid material a volatile organic liquid with which it is associated.

Numerous industrial operations involve a step of drying a solid material containing a volatile organic liquid, such as a solvent used in a preceding stage of the operation. It is usually desirable to recover as much of the volatile liquid as possible so that it may be used again in the process. Where the drying is done by contacting the solid material with hot gas, a large volume of low pressure gas containing the evaporated liquid in small proportion is generally obtained. Consequently it is difficult to recover the liquid economically, since a large amount of heat transfer surface is required to condense the liquid from the gas.

The present invention provides an improved system for drying a solid material containing a volatile organic liquid and for recovering a major part of the liquid so that it can be re-used. According to the invention hot inert gas is circulated through a system comprising a drying zone where it is contacted with the solid material at relatively low pressure, a compression zone where its pressure is raised to a relatively high value, a condensing zone where the vaporized liquid is condensed at such high pressure, a high pressure burning zone to which also are fed fuel and air in sufficient amount to maintain the temperature of the circulating gas at the desired level, and a turbine through which the product from the burner is expanded down to a relatively low pressure for circulation again to the drying zone at low pressure. Power obtained from the turbine is utilized to drive the aforesaid compressor and also to drive another compressor utilized for pressurizing the air and fuel fed to the burner. A minor amount of the circulating gas is vented from the system, preferably between the turbine and the drying zone, the amount being equivalent to the amount of combustion products added to the system by the burning of the fuel.

The invention is more specifically described with reference to the accompanying drawing which is a schematic illustration of a system for conducting the present process.

Referring to the drawing, 10 represents the drying zone wherein the solid material containing an organic solvent is contacted with hot gas which is introduced through line 11 at relatively low pressure. Zone 10 can be a countercurrent contact zone with the wet granular solid material being fed into the top and the dry product being withdrawn from the bottom continuously. Alternatively, the drying zone can comprise two or more receptacles in which the solid material is treated batchwise and alternately in the several receptacles. The low pressure maintained in the drying zone is conductive to effecting vaporization of the solvent from the solid material into the hot treating gas.

The inert gas containing the vaporized solvent passes from zone 10 through line 12 into a compressor 13 which is connected, as indicated by shaft 14, to a turbine 15 which provides the power necessary for running the compressor. After compression the gas passes through line 16 to a condenser 17 to effect condensation of most of the contained solvent which is withdrawn as indicated by line 18. This arrangement whereby the gas is passed through the condenser at relatively high pressure is effective for securing condensation of most of the solvent without requiring an excessive amount of heat transfer surface in the condenser. As a general rule the absolute pressure in condenser 17 should be at least three times, preferably 4–6 times, the absolute pressure used in the drying operation in zone 10.

The cooled gas from condenser 17 is circulated via line 19 to a high pressure burner 20. A second compressor 21 connected by shaft 22 to turbine 15 is provided so that fuel and air, which enter the system through line 23, can also be fed at high pressure to the burner by means of line 24. The amount of fuel and air introduced to burner 20 is sufficient to raise the temperature of the circulating gas to the level desired for the drying operation in zone 10. The products formed by the combustion of the fuel generally will constitute only a minor portion of the total gas being circulated. As the gas circulated from condenser 17 passes through burner 20, the small amount of solvent inevitably contained therein is also burned, so that the heating value from combustion of such solvent is utilized in the operation. The heated gas mixture from the burner passes at high pressure through line 25 to turbine 15 and is therein expanded to relatively low pressure to supply the power necessary for driving compressors 13 and 21. After expansion the hot gas circulates through lines 26 and 11 to the drying zone.

In order to prevent the amount of circulating gas from building up in the system, gas is vented from the system in an amount equivalent to the products of combustion of the fuel and air introduced into burner 20. This is preferably done between turbine 15 and drying zone 10, as indicated by vent line 27, in order to prevent any solvent from being bled from the system. However, such venting could, if desired, be done from some other point such as from the gas exit line from condenser 17.

In the foregoing description it is assumed that the fuel employed is gaseous, e.g. natural gas. However, if a liquid fuel is to be used, only air would be compressed in compressor 21 and a pump (not shown) would be provided to pump the fuel into burner 20. If desired, turbine 15 could be utilized as the source of power for running the pump also.

The following description sets forth a specific example in which the invention is utilized to remove residual toluene from a granular polymer which has been washed with toluene in a previous processing step. For purpose of description it is assumed that 1000 lbs./hr. of toluene are to be removed from the polymer.

The polymer is continuously fed to drying zone 10 and is therein contacted with 3000 lbs./hr. of hot gas derived from turbine 15, such gas having a temperature of about 360° F. and a pressure only sufficiently above atmospheric to force the gas through the drier. Exit gas from the drier has a temperature of about 110° F. and contains 1000 lbs./hr. of toluene. This gas is passed to compressor 13 wherein the pressure is raised to about 75 p.s.i.g. and the heat of compression causes its temperature to rise to about 300° F. The gas then passes to condenser 17 and is cooled to a temperature of 90° F. by indirect heat exchange with 80° F. cooling water. This causes about 98% of the toluene to condense, so that 980 lbs./hr. of the toluene are recovered.

The cool gas, containing 20 lbs./hr. of toluene, is fed to burner 20 along with 310 cu.ft./hr. of natural gas and 660 lbs./hr. of air from compressor 21. The pressure in the burner is 75 p.s.i.g. less the pressure drop through condenser 17 and line 19. Burning of the hydrocarbons causes the temperature to increase to about 900° F., and the hot gas passes directly into turbine 15 wherein it is expanded down to a pressure approaching atmospheric and a temperature of about 360° F. About 700 lbs./hr. of the expanded gas is vented from the system through line 27 and the remainder passes to drier 10 as previously described.

It is to be noted that while about 20 lbs./hr. of toluene are burned in the above-described example, this provides about 350,000 B.t.u./hr. of heat energy which is utilized in conducting the operation. Also, this amounts to a loss of only 2% of the toluene.

By way of comparison, if the low pressure gas from drier 10 is sent directly to condenser 17 without compression and with the same condenser conditions, only about 44% of the toluene would be recovered as condensate. In order to secure 98% recovery as obtained in the foregoing example, expensive refrigeration would be required if the compressing step is omitted.

From the foregoing description it can be seen that the present invention provides an economical and advantageous manner for recovering a volatile organic liquid from a solid material. Various modifications may be made without departing from the scope of the invention. For example, under some operating conditions, the amount of energy recovered upon expanding the hot gas in the turbine may be sufficient to drive only one of the compressors, in which case the other compressor can be operated from another power source. Also, as previously mentioned, venting of gas from the system to keep a constant amount circulating can be done by withdrawing gas after it leaves the cooler. This would avoid loss of the sensible heat content of gas vented in the manner shown in the drawing but would lose from the system the heating value of the volatile organic material vented with the cool gas. Also, in the event that the vented gas is admitted to the atmosphere, it could raise an air pollution problem due to the presence of the residual organic material. Accordingly, it is preferable to withdraw gas from the system in the manner described in connection with the drawing.

I claim:

1. Method of removing a volatile combustible liquid from the drying gas used in drying solid material containing said liquid which comprises contacting said material with a hot gas at relatively low pressure in a drying zone, compressing the gaseous effluent in a compression zone to a relatively high pressure, passing the compressed gas to a cooling zone and condensing a major part of the combustible liquid therefrom, compressing air and fuel in another compression zone to a relatively high pressure, burning the compressed mixture in a burning zone, passing effluent gas from said cooling zone into the burning zone at relatively high pressure and therein burning residual combustible liquid contained in said effluent, expanding the hot combustion product mixture in an expansion zone to said relatively low pressure, utilizing the expanded product as the hot drying gas, and utilizing the power developed in expansion of the mixture in at least one of the compression zones.

2. Method according to claim 1 including removing from the system said expanded product in amount approximately equivalent to the amount of combustion products resulting from the burning of the fuel and air 3. A system for drying a solid material containing a volatile combustible liquid which comprises a contact zone for contacting said material with a hot gas at relatively low pressure, a compressor, means for feeding effluent gas from said contact zone to said compressor, means for cooling the compressed gas to condense combustible liquid therefrom, a high pressure burning zone, means for compressing air and fuel and feeding the same to said burning zone, means for cycling cool compressed gas from the condensing zone to the burning zone, a turbine, means for passing combustion product from the burning zone through the turbine, means for utilizing power from the turbine to drive at least one of said compressors, and means for passing a portion of the expanded product from the turbine into said contact zone as said hot gas.

References Cited in the file of this patent

UNITED STATES PATENTS

| 1,277,895 | Foster | Sept. 3, 1918 |
| 2,795,054 | Bowen | June 11, 1957 |

FOREIGN PATENTS

| 987,173 | France | Apr. 11, 1951 |
| 229,249 | Switzerland | Oct. 15, 1943 |